United States Patent [19]
Sasaki

[11] Patent Number: 5,228,118
[45] Date of Patent: Jul. 13, 1993

[54] PRINTING SYSTEM WHEREIN ONE OF PRINTER DRIVERS THROUGH WHICH PRINT DATA IS SENT FROM A DATA PROCESSOR TO A PRINTER IS SELECTED BASED ON INTERPRETERS AVAILABLE ON THE PRINTER

[75] Inventor: Ichiro Sasaki, Aichi, Japan

[73] Assignee: Brother Kogyo Kabushiki Kaisha, Nagoya, Japan

[21] Appl. No.: 904,491

[22] Filed: Jun. 25, 1992

[30] Foreign Application Priority Data

Jun. 29, 1991 [JP] Japan .................................. 3-185309

[51] Int. Cl.⁵ ............................................ G06K 15/00
[52] U.S. Cl. ...................................... 395/112; 395/114
[58] Field of Search ............... 395/112, 114, 200, 325, 395/500; 400/61-65, 76, 67, 70-71; 358/407, 467, 468

[56] References Cited

U.S. PATENT DOCUMENTS

4,926,347 5/1990 Uchida et al. ....................... 395/112
4,992,957 2/1991 Aoyama et al. .................... 395/112

Primary Examiner—Arthur G. Evans
Attorney, Agent, or Firm—Oliff & Berridge

[57] ABSTRACT

A printing system including a printer having at least one interpreter for interpreting print data for performing a printing operation, and a data processor connected to the printing device and having a plurality of printer drivers through which the print data are sent to the printer device. The data processor sends to the printer an inquiry signal asking the printer to send back to the data processor interpreter-identification data representative of the interpreter or interpreters. The data processor selects one of the printer drivers compatible with the interpreter or one of the interpreters, on the basis of the interpreter-identification data. The printer sends the interpreter-identification data to the data processor, in response to the inquiry signal.

22 Claims, 8 Drawing Sheets

PRINTING SYSTEM WHEREIN ONE OF PRINTER DRIVERS THROUGH WHICH PRINT DATA IS SENT FROM A DATA PROCESSOR TO A PRINTER IS SELECTED BASED ON INTERPRETERS AVAILABLE ON THE PRINTER

BACKGROUND OF THE INVENTION

1. Field of the Invention

The present invention relates in general to a printing system which includes at least one printing device having one or more language interpreter for interpreting received print data, and at least one data processing device which is connected to the printing device or devices through a bidirectional interface and each of which has a plurality of printer drivers through which the print data are sent to the printing device or devices. More particularly, the present invention is concerned with such a printing system capable of automatically selecting one of the printer drivers available on the data processing device, or automatically selecting one of the printing devices which is compatible with the data processing device from which the print data are sent.

2. Discussion of the Prior Art

A data or text processing device of modern vintage known as "word processors", "personal computers" or "work stations" is provided with various printer drivers which are compatible with or applicable to respective language interpreters available on various types of printers, so that batches of print data sent from the data processing device are described or expressed in different printing control languages that can be interpreted by the respective language interpreters. Thus, the provision of such various printer drivers on a data processing device permits a printing system in which the data processing device is connected to two or more different printers. There is also known a printing system wherein a printer having a plurality of language interpreters is connected to different types of data processing devices such as personal computers. In this printing system, one of the language interpreters of the printer is automatically selected depending upon the printing control language in which the print data received from a specific one of the data processing devices are described. However, each data processing device is not capable of automatically selecting one of the printer drivers through which the print data are sent to the printer.

Generally, the printing control languages in which the print data are sent from the respective printer drivers provided on ordinary data processing devices are standard languages which conform with a standard called "DEFACT STANDARD". Commonly known printing control languages include a language suitable for a plotter used in the field of CAD (computer-aided design), a language suitable for a personal or office printer for ordinary documentation, and a language suitable for a type setter as well as the office printer.

Modern enterprises are using a network system which includes a plurality of computers interconnected with a communication cable, and one or more printers for printing various sorts of output data of the computers.

In the case where one printer in the network system indicated above is provided with two or more language interpreters compatible with the appropriate printer drivers of the computers, the operator of each computer is required to select one of the printer drivers which is applicable to one of the language interpreters of the printer, upon sending of print data from that computer to the printer when a new software is set in the computer or the printer is changed from one type to another.

Where a network system includes a plurality of printers, and the operator of a computer or other data processing device connected to the printers selects one of the printer drivers, the operator has to select one of the printers which has the language interpreter compatible with the selected printer driver.

As indicated above, when print data are sent from a data processing device to a specific printer, the operator of the data processing device has to select one of the printer drivers which is compatible with one of the language interpreters of the printer. Accordingly, the operator must check the compatibility between the language interpreters available on the printer, and the printer drivers available on the data processing device, in order to determine the printer driver through which the print data are sent to the printer. Thus, the selection of the appropriate printer driver on the data processing device is cumbersome and time-consuming. Further, the language interpreters and the printer drivers may be revised or modified, and new interpreters and printer drivers may be added to the printer and data processing device. In this case, the selection of the appropriate printer driver is further complicated.

In a network system including a plurality of data processing devices and a plurality of printers, the operator of each data processing device has to select one of the printers which has the interpreter or interpreters compatible with the printer drivers available on the data processing device. In this case, too, the operator must check the compatibility of the interpreters and the printer drivers, in order to select the appropriate printer to which the print data are sent through the appropriate printer driver. Thus, the selection of the appropriate printer is cumbersome and time-consuming, particularly when the interpreters and printer drivers are modified or new interpreters and printer drivers are added, as indicated above.

For the reasons described above, the conventional printing system or network including at least one data processing device and at least one printing device is not fully automated, requiring the operator's operation upon sending of print data to the appropriate printer, upon installation of a new software in the data processing device or upon changing of the printer from one type to another. Thus, the conventional printing system suffers from a relatively long overall non-printing time of the printers and relatively low overall printing efficiency of the system.

SUMMARY OF THE INVENTION

It is therefore an object of the present invention to provide a printing system which is automated for improved printing efficiency and which minimizes the operator's labor for printing setup.

Figure 1:
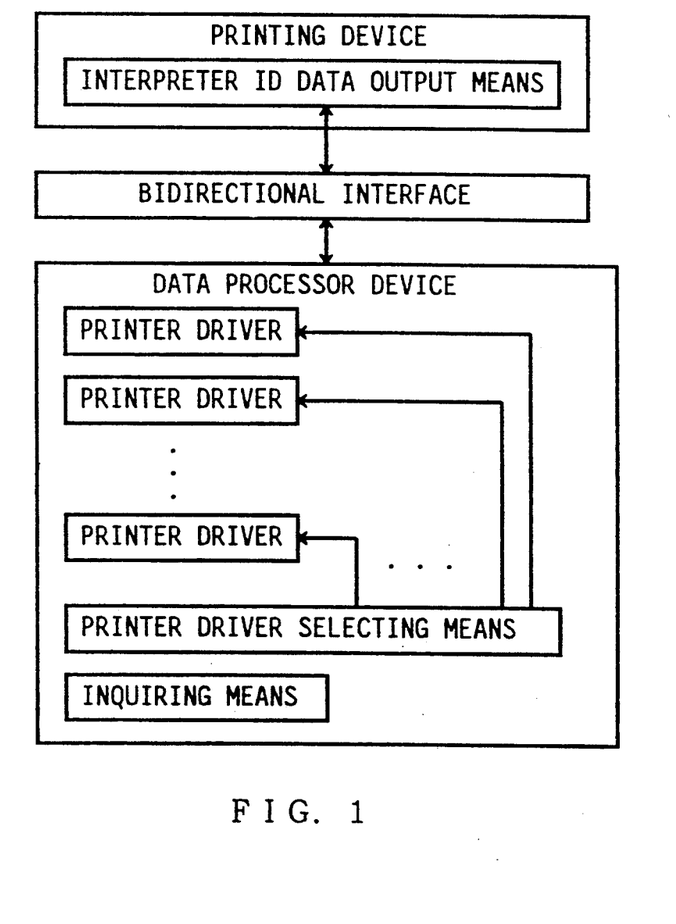
FIG. 1 is a block diagram showing functional elements of a printing system constructed according to one aspect of this invention.

The above object may be attained according to one aspect of this invention, which provides a printing system as schematically shown in FIG. 1. This printing system includes a printing device which has at least one language interpreter for interpreting print data for performing a printing operation, and a data processing device which is connected to the printing device through a bidirectional interface and which has a plurality of printer drivers through which the print data are sent to the printing device. The data processing device includes inquiring means for sending to the printing device an inquiry signal to ask the printing device to send back to the data processing device interpreter-identification data representative of the at least one language interpreter, and printer driver selecting means for selecting one of the plurality of printer drivers which is compatible with one of the at least one language interpreter, on the basis of the interpreter-identification data received from the printing device. The printing device includes ID data output means responsive to the inquiry signal, for sending the interpreter-identification data to the data processing device.

In the printing system constructed as described above, the ID data output means of the printing device sends to the data processing device the interpreter-identification data representative of the language interpreter or interpreters available on the printing device, when the inquiry signal is received from the inquiring means of the data processing device through the bidirectional interface between the data processing and printing devices. On the basis of the interpreter-identification data received from the printing device, the printer driver selecting means of the data processing device selects one of the printer drivers thereof which is compatible with the language interpreter or one of the interpreters of the printing device. The data processing device sends to the printing device a batch of print data representative of letters, symbols and other characters, via the selected printer driver, so that the printing device can interpret the print data by means of the appropriate interpreter, to perform a printing job according to the interpreted print data.

As indicated above, one of the printer drivers of the data processing device is automatically selected by the printer driver selecting means on the basis of the interpreter or interpreters of the printing device represented by the interpreter-identification data sent from the ID data output means of the printing device in response to the inquiry signal sent from the inquiring means of the data processing device. Accordingly, the operator of the data processing device does not have to manipulate the data processing device for selecting an appropriate one of the printer drivers when the print data are transmitted to the printing device, whereby the printing system is automated for improved printing efficiency.

Figure 2:
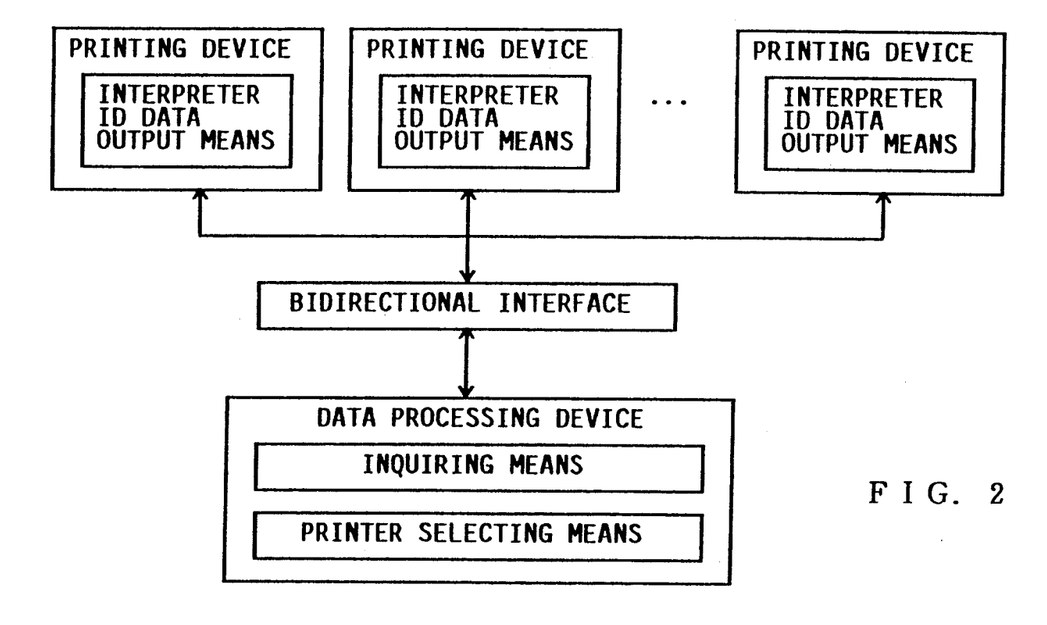
FIG. 2 is a block diagram showing functional elements of a printing system constructed according to another aspect, of the present invention.

The same object may also be attained according to another aspect of the present invention, which provides a printing system as schematically shown in FIG. 2. This printing system includes a plurality of printing devices each of which has at least one language interpreter for interpreting print data for performing a printing operation, and at least one data processing device each of which is connected to the plurality of printing devices through a bidirectional interface and has at least one printer driver through which the print data are sent to one of the plurality of printing devices. Each data processing device includes inquiring means for sending to the plurality of printing devices an inquiry signal to ask the printing devices to send back to each data processing device interpreter-identification data representative of the at least one language interpreter of each of the printing devices, and printer selecting means for selecting, on the basis of the interpreter-identification data received from the printing devices, one of the printing devices which has the language interpreter compatible with one of the at least one printer driver of the data processing device. On the other hand, each printing device includes ID data output means responsive to the inquiry signal received from the at least one data processing device, for sending the interpreter-identification data of the printing device to one of the at least one data processing device from which the inquiry signal is received.

In the printing system constructed as described above according to the second aspect of this invention, the ID data output means of each printing device sends the interpreter-identification data representative of the language interpreter or interpreters available on the printing device, to the data processing device from which the inquiry signal is received, when the inquiry signal is received from the inquiring means of the appropriate data processing device through the bidirectional interface. On the basis of the interpreter-identification data received from the printing devices, the printer selecting means of the appropriate data processing device selects one of the printing devices which has the language interpreter compatible with the pre-selected printer driver. The print data representative of an image to be printed are sent via the pre-selected printer driver to the selected printing device, which has the language interpreter for interpreting the received print data, so that a printing operation may be performed according to the print data as interpreted by the appropriate interpreter of the selected printing device.

As described above, one of the printing device is automatically selected by the printer selecting means of the data processing device, on the basis of the interpreters of the printing devices represented by the interpreter-identification data which are sent from the ID data output means of each printing device, in response to the inquiry signal sent from the inquiring means of the data processing device. Accordingly, the operator of the data processing device does not have to manipulate the data processing device for selecting an appropriate one of the printing devices when the print data are transmitted to the printing device, whereby the printing system is automated for improved printing efficiency.

BRIEF DESCRIPTION OF THE DRAWINGS

The above and optional objects, features and advantages of the present invention will be better understood by reading the following detailed description of presently preferred embodiments of the invention, when considered in connection with the accompanying drawings, in which.

DETAILED DESCRIPTION OF THE PREFERRED EMBODIMENTS

Figure 3:
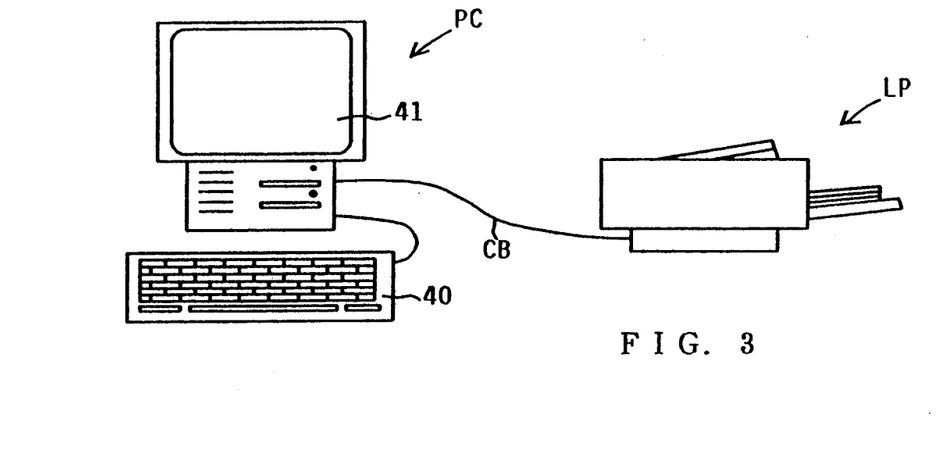
FIG. 3 is an illustration showing a general arrangement of one embodiment of a printing system of the present invention.

Referring first to FIG. 3, there is shown a printing system constructed according to one embodiment of the present invention. The printing system consists of a printing device in the form of a laser printer LP capable of performing printing job according to print data, a data processing device in the form of a personal computer PC which provides the laser printer LP with the print data, and a communication cable CB connecting the laser printer LP and the personal computer PC.

Figure 4:
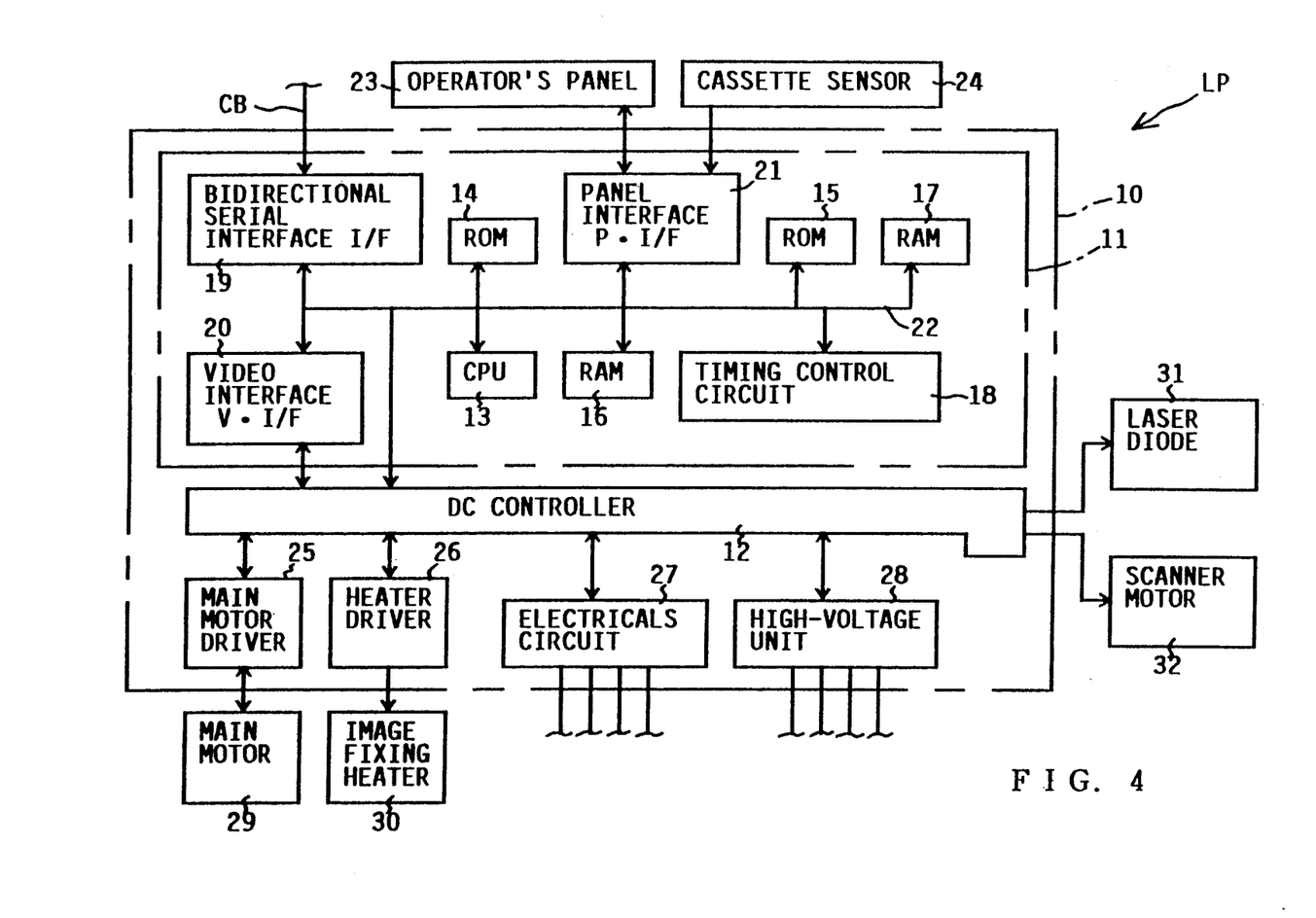
FIG. 4 is a schematic block diagram showing a laser printer used in the printing system of FIG. 3.

Referring next to the block diagram of FIG. 4, there will be briefly described the control arrangement of the laser printer LP, which is basically similar to those of commonly known laser printers.

The laser printer LP has a control unit generally indicated at 10 in FIG. 4. The control unit 10 includes a video controller 11 and a DC controller 12. The video controller 11 incorporates: a CPU (central processing unit) 13; a first ROM (read-only memory) 14; a second ROM (read-only memory) 15; a first RAM (random-access memory) 16; a second RAM (random-access memory) 17; a timing control circuit 18; a bidirectional serial interface (I/F) 19; a video interface (V·I/F) 20; a panel interface (P·I/F) 21; and a data bus 22 which interconnects the elements of the video controller 11 described above.

The first ROM 14 stores: various control programs associated with printing operations of the printer LP; LANGUAGE INTERPRETER A and LANGUAGE INTERPRETER B for processing or interpreting printing control languages in which print data received from the personal computer PC are described or expressed; interpreter-identification data representative of the INTERPRETER A and INTERPRETER B; and an ID DATA OUTPUT control program for sending the interpreter-identification data to the personal computer PC in response to an inquiry signal from the personal computer PC, as described below.

The second ROM 15 stores outline data representative of the outlines of a multiplicity of characters such as letters and symbols to be printed according to the print data received from the personal computer PC. The first RAM 16 has a suitable storage capacity for storing the print data and other data received from the personal computer PC, and the second RAM 17 is a working memory which includes a storage area for storing a batch of dot data prepared by conversion from the print data stored in the first RAM 16. The timing control circuit 18 generates timing signals for storing data into the first RAM 16 and reading out the data from the first RAM 16. The serial interface (I/F) 19 functions to receive data from the personal computer PC and transmitting various sorts of data and signals to the personal computer PC. The video interface (V·I/F) 20 consists of two scan buffers each of which is a dual-port RAM (FIFO memory) having a 4 K-byte capacity. The video interface 20 functions to apply the dot data one set after another from the second RAM 17 to the DC controller 2. The panel interface (P·I/F) is connected to an operator's panel 23 and a cassette sensor 24 of the laser printer LP.

The LANGUAGE INTERPRETER A is suitable for interpreting a printing control language (print data language) for a personal or office printer for ordinary text-oriented documentation, while the LANGUAGE INTERPRETER B is suitable for interpreting a printing control language (print data language) for a plotter generally used in the field of computer-aided design (CAD). As described above, the interpreter-identification data which represent these INTERPRETERS A, B are stored in the first ROM 14, and are transmitted to the personal computer PC according to the ID DATA OUTPUT control program, in response to the inquiry signal from the computer PC.

The cassette sensor 24 acts on a detecting piece provided at a suitable portion of a paper storage cassette mounted in the laser printer LP, so that the sensor 24 generates a paper size signal indicative of the size of paper sheets accommodated in the cassette. The paper size signal is fed to the panel interface 21.

To the DC controller 12 of the control unit 10, there are connected a main motor driver 25 for a main motor 29, a heater driver 26 for an image fixing heater 30, an electricals circuit 27, and a high-voltage unit 28. To the DC controller 12, there are also connected a semiconductor lasing element in the form of a laser diode 31, and a scanner motor 32 for rotating a polygon mirror which has six light reflecting faces for scanning a photoconductive drum with the laser beam which is generated by the laser diode 31 and deflected by the polygon mirror, as well known in the art.

Figure 5:
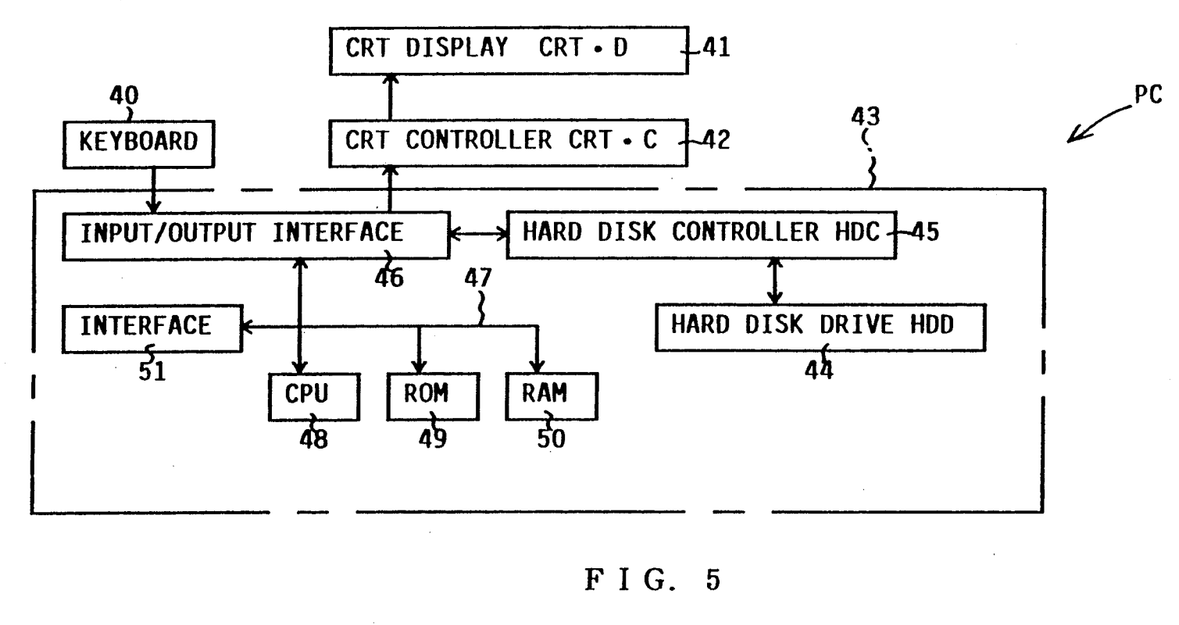
FIG. 5 is a schematic block diagram showing a personal computer used in the printing system of FIG. 3.

Referring further to the block diagram of FIG. 5, there is shown the control arrangement of the personal computer PC, which is provided with a keyboard 40, a CRT display (CRT·D) 41 and a CRT controller (CRT·C) 42 for controlling the CRT display 41. The personal computer PC has a control device generally indicated at 43, to which the keyboard 40, CRT display 41 and CRT controller 42 are connected through an input/output interface 46. The control device 43 further incorporates a CPU (central processing unit) 48, a ROM 49 (read-only memory) 49, a RAM (random-access memory) 50, and an interface 51, which are connected to each other and to the input/output interface 46 through a data bus 47. To the input/output interface 46, there are also connected a hard disk drive (HDD) 44, and a hard disk controller (HDC) 45 for controlling the hard disk drive 44.

Figure 6:
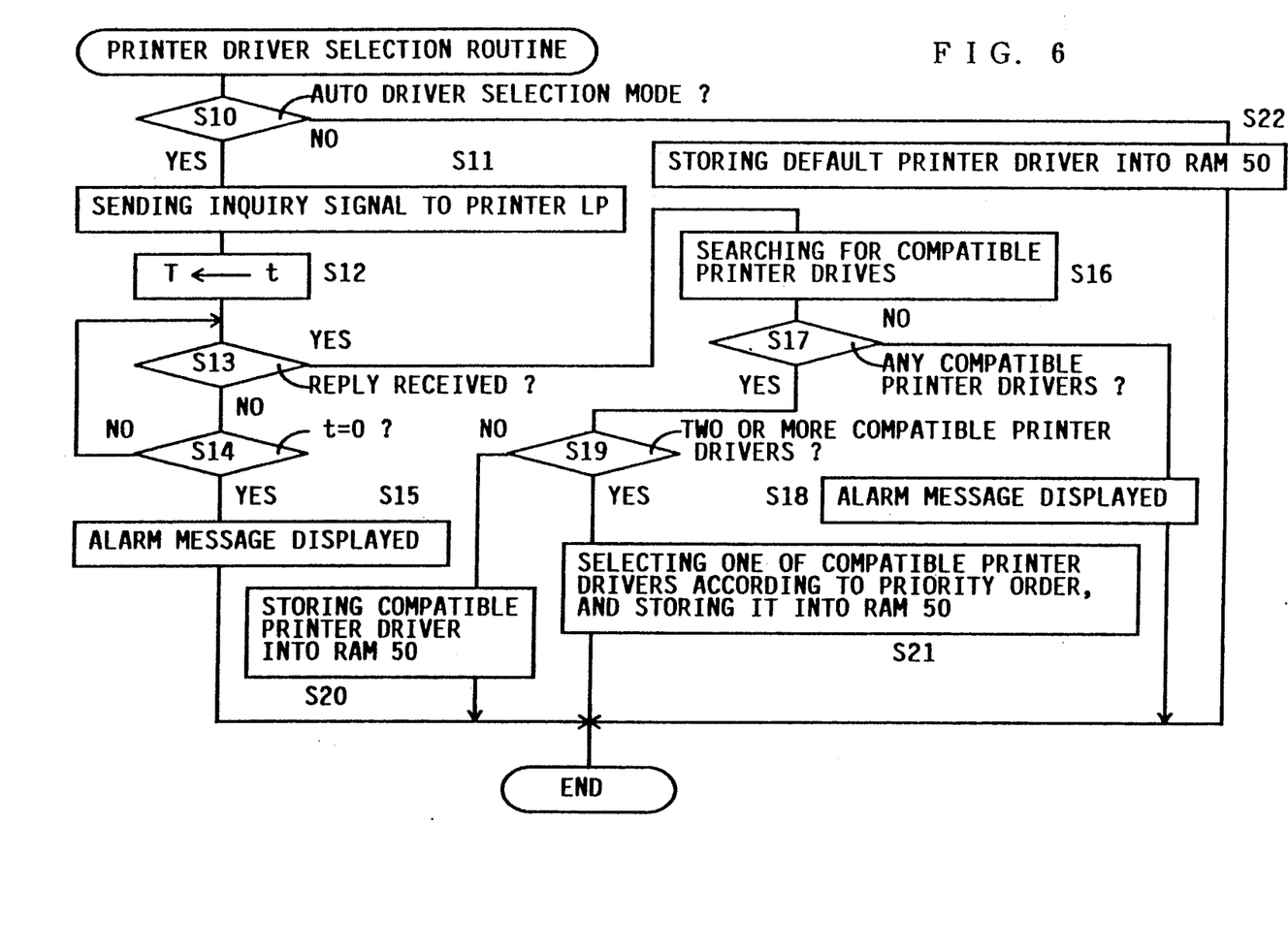
FIG. 6 is a flow chart illustrating a printer driver selection routine executed by a control device of the personal computer.

The hard disk drive 44 is adapted to accept a hard disk which stores: various control programs for controlling the personal computer PC; a printer driver selection control program for executing a PRINTER DRIVE SELECTION routine of FIG. 6; a PRINTER DRIVER C for preparing print data by conversion in a language that can be interpreted by the LANGUAGE INTERPRETER A stored in the laser printer LP; a PRINTER DRIVER D for preparing print data by conversion in a language that can be interpreted by the LANGUAGE INTERPRETER B also stored in the laser printer LP; and other printer drivers for other printing control languages that can be interpreted by the other language interpreters available on the other printers which are connectable to the personal computer PC. The ROM 49 stores a bootstrap for transferring an initializing program to the RAM 50 upon application of power to the personal computer PC, and a character generator for displaying characters [such as letters and symbols) on the CRT display 41.

The interface 51 is a bidirectional serial interface for bidirectional data communication between the control device 43 and the control unit 10 of the laser printer LP.

The interface 51 incorporates a central processing unit, a read-only memory and a random-access memory, so that the interface 51 is connectable to a network of two or more external devices.

Reference is now made to the flow chart of FIG. 6, which illustrates the PRINTER DRIVER SELECTION routine executed by the control device 43 of the personal computer PC.

The PRINTER DRIVER SELECTION routine of FIG. 6 is initiated when a suitable key on the keyboard 40 is pressed to send a batch of print data to the laser printer LP. The routine begins with step S10 to determine whether or not the control device 43 is placed in an automatic printer driver selection mode, in which one of the printer drivers stored in the hard disk in the hard disk drive 44 is automatically selected in the manner described below. If the automatic printer driver selection mode is currently established (if an affirmative decision "Yes" is obtained in step S10), the control flow goes to step S11 in which an inquiry signal is sent to the laser printer LP, to ask the printer LP to send back the interpreter-identification data which represent the types of the language interpreters available on the printer LP, i.e., INTERPRETER A and INTERPRETER B in the present example. Step S11 is followed by step S12 in which a decrement timer counter T provided in the CPU 48 is set to "t".

In response to the inquiry signal received from the personal computer PC, the video controller 11 of the laser printer LP executes the ID DATA OUTPUT control program (stored in the first ROM 14), to send the interpreter-identification data to the personal computer PC.

Step S12 is followed by step S13 to monitor whether or not a reply to the inquiry signal has been received from the laser printer LP, that is, whether or the control device 43 has received the interpreter-identification data from the printer LP. If a negative decision (No) is obtained in step S13, step S14 is implemented to check whether or the predetermined timer "t" has elapsed. Steps S13 and S14 are repeatedly implemented until a reply to the inquiry signal has been received or the preset time "t" has elapsed.

When the control device 43 has received the interpreter-identification data from the laser printer LP, step S13 is followed by step S16 to find out the printer driver or drivers in the hard disk, which is/are compatible with or applicable to the language interpreter or interpreters represented by the received interpreter-identification data. In this example, the PRINTER DRIVER C compatible with the INTERPRETER A, and the PRINTER DRIVER D compatible with the INTERPRETER B are found in the hard disk in step S22. The control flow then goes to step S17 to determine whether any printer driver is found or not. If an affirmative decision (Yes) is obtained in step S17, step S19 is implemented to determine whether two or more printer drivers compatible with the appropriate language interpreters have been found or not. If the hard disk stores only one printer driver, a negative decision (No) is obtained in step S19, and the control flow goes to step S20 in which this single printer driver is read out from the hard disk and stored in the RAM 50, and the present routine is terminated.

If an affirmative decision (Yes) is obtained in step S19, namely, if two or more printer drivers (PRINTER DRIVER C and PRINTER DRIVER D in this example) are stored in the hard disk in the hard disk drive 44, step S21 is implemented to select one (e.g., PRINTER DRIVER C) of these printer drivers according to a predetermined priority order of selection, and store the selected printer driver in the RAM 50. The present PRINTER DRIVER SELECTION routine may be adapted so that the two or more printer drivers compatible with the language interpreters of the laser printers LP are displayed on the CRT display 41, for permitting the operator to select the desired one of these displayed printer drivers.

After the appropriate printer driver (e.g., PRINTER DRIVER C compatible with the INTERPRETER A) is selected, the personal computer PC sends to the laser printer LP via the selected printer driver, a batch of print data representative of the desired printing job to be performed by the laser printer LP. In response to the print data, the laser printer LP automatically selects one of the INTERPRETER A and INTERPRETER B which is applicable to the printer driver selected by the computer PC. The print data received by the printer LP are processed by the selected language interpreter, e.g., INTERPRETER A, and the printing job is performed according to the processed print data.

If the automatic printer driver selection mode is not established, namely, if a negative decision (No) is obtained in step S10, the control flow goes to step S22 in which a printer driver predetermined as a default driver is selected and stored in the RAM 50. If the predetermined time "t" has elapsed without the interpreter-identification data received from the laser printer LP, an affirmative decision (Yes) is obtained in step S14, and the control flow goes to step S15 in which a suitable alarm message is provided on the CRT display 41. The alarm message may be a statement "CHECK THE COMMUNICATION CABLE. CHECK IF THE PRINTER IS ON.". If no printer driver compatible with the language interpreters represented by the received interpreter-identification data is found in the hard disk in the hard disk drive 44, a suitable alarm message is provided on the display 41. The alarm message may be a statement "PRINTING IS NOT POSSIBLE ON THE PRINTER TO WHICH THIS COMPUTER IS CONNECTED.".

In the present example wherein the PRINTER DRIVER C and PRINTER DRIVER D which are applicable to or compatible with the INTERPRETER A and INTERPRETER B, respectively, are stored in the hard disk in the hard disk drive 44 of the personal computer PC, these two printer drivers, PRINTER DRIVER C and PRINTER DRIVER D, are both found in step S16 according to the interpreter-identification data received from the laser printer LP. Either the PRINTER DRIVER D or the PRINTER DRIVER D which has the higher priority is selected. For instance, the PRINTER DRIVER C is selected, and the print data are sent to the printer LP via the selected PRINTER DRIVER C, so that characters such as letters and symbols represented by the print data are printed on a suitable recording medium by the printer LP, according to the print data as processed by the INTERPRETER A.

As described above, the present printing system is adapted such that the printer driver compatible with one of the language interpreters stored in the printer LP is automatically selected by the personal computer PC according to the interpreter-identification data, which are sent from the printer LP in response to the inquiry signal from the computer PC. Thus, the operator of the personal computer PC does not have to manipulate the keyboard 40 for selecting one of the printer drivers available on the computer PC.

While the printing system of FIGS. 3-6 described above includes one personal computer PC connected to one laser printer PC, two or more personal computers may be connected to one laser printer or other printing device. The present invention is also applicable to a printing system which includes a data processing device or devices such as word processors or work stations other than a personal computer, and a printing device or devices such as dot-matrix or other types of printers.

Figure 7:
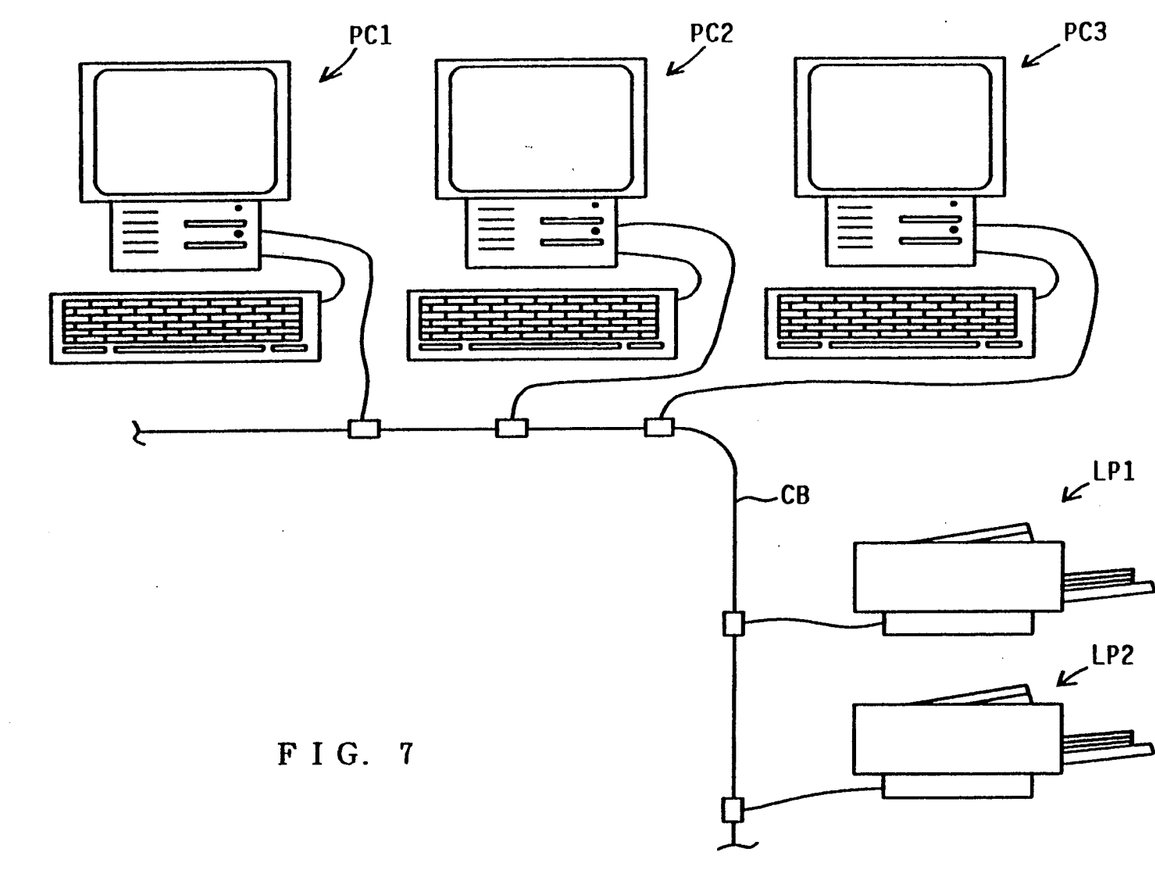
FIG. 7 is an illustration showing a general arrangement of another embodiment of this invention.
Figure 8:
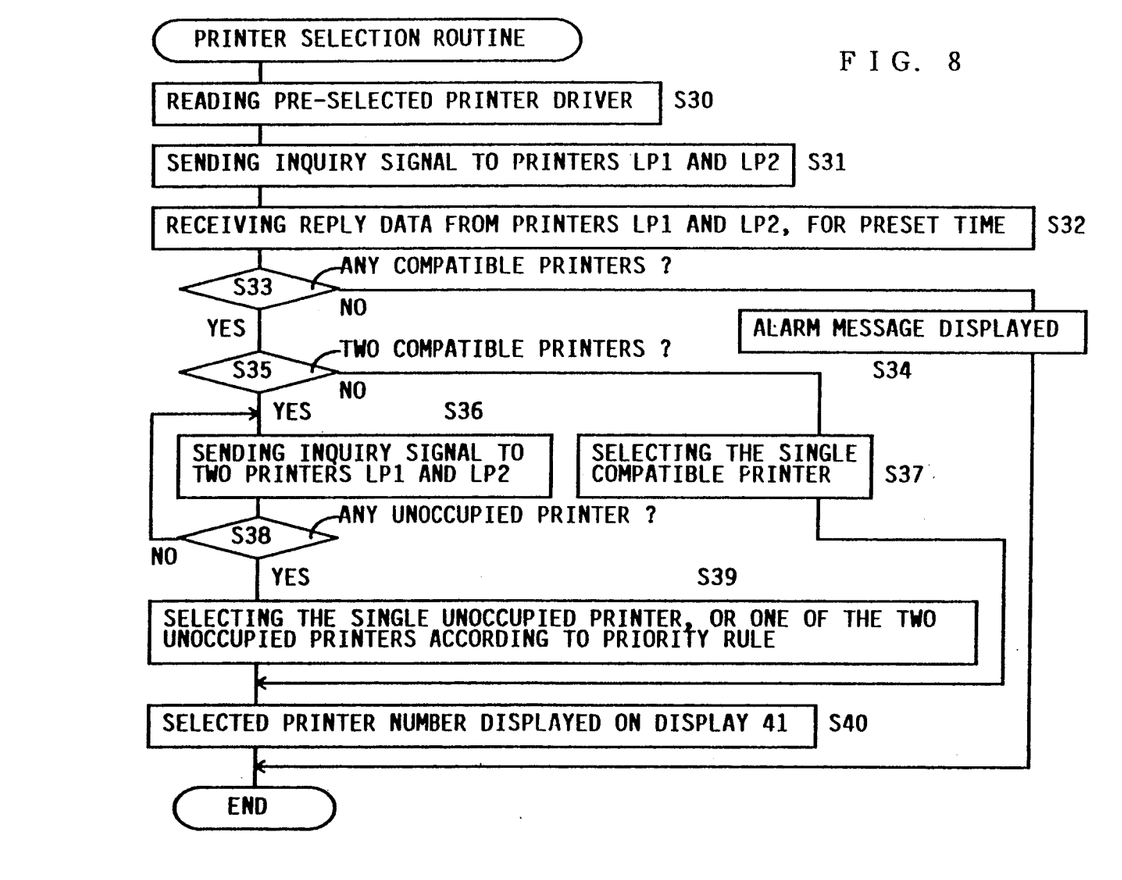
FIG. 8 is a flow chart illustrating a printer selection routine executed by a control device of one of personal computers of the printing system of FIG. 7.

Referring next to FIGS. 7 and 8, there will be described another embodiment of the present invention in the form of a printing system consisting of a network of three personal computers PC1, PC2 and PC3, and two laser printers LP1 and LP2 connected to the personal computers PC1-PC3 through communication cables CB. In this printing system, each personal computer PC is capable of automatically selecting one of the two laser printers LP1, LP2 which can accept a batch of print data sent from that personal computer.

Each personal computer PC1, PC2, PC3 is identical with the personal computer PC in the preceding embodiment, while each laser printer LP1, LP2 is identical with the laser printer LP in the preceding embodiment. Described more specifically, the first laser printer LP1 has a first ROM A (corresponding to the ROM 14 of the printer LP) which stores the LANGUAGE INTERPRETER A and LANGUAGE INTERPRETER B. Similarly, the second laser printer LP2 has a first ROM B which stores the LANGUAGE INTERPRETERS A and B. On the other hand, each of the hard disks used for hard disk drives A, 44B, 44C of the first, second and third personal computers PC1, PC2 and PC3 stores the PRINTER DRIVER C, PRINTER DRIVER D and other printer drivers, and also stores a printer selection control program for executing a PRINTER SELECTION routine as illustrated in the flow chart of FIG. 8, which will be described.

The PRINTER SELECTION routine will be described by reference to FIG. 8, with respect to the personal computer PC1, by way of example. In the personal computer PC1, a desired one of the printer drivers, for instance, PRINTER DRIVER C, is pre-selected as the effective printer driver through which a batch of print data is sent to the laser printer LP1 or LP2.

Upon operation of a suitable key on the keyboard 40 of the personal computer PC1, the PRINTER DRIVER SELECTION routine of FIG. 8 is started with step S30 in which the pre-selected PRINTER DRIVER C is recognized. Then, step S31 is implemented to send to the laser printers LP1, LP2 an inquiry signal in a broadcasting fashion, for asking the printers LP1, LP2 to send back a reply as to whether each printer LP1, LP2 has any language interpreters, i.e., INTERPRETER A, which is compatible with the PRINTER DRIVER C. In response to the inquiry signal, the video controller 11 of each laser printer LP1, LP2 executes the ID DATA OUTPUT control program to send to the personal computer PC1 the interpreter-identification data representative of the language interpreters available, together with printer-identification data indicative of the printer LP1, LP2.

Step S31 is followed by step S32 in which the control device 43 of the personal computer PC1 receives the reply data from the laser printers LP1, LP2, for a predetermined suitable length of time. When this length of time has passed, step S33 is implemented to determine whether the INTERPRETER A compatible with the PRINTER DRIVER C is available on either of the two laser printers LP1, LP2, namely, whether the printers LP1, LP2 are compatible with the pre-selected PRINTER DRIVER A. If an affirmative decision (Yes) is obtained in step S33, step S35 is implemented to determine whether or not both of the printers LP1, LP2 are compatible with the PRINTER DRIVER C. If only one of the two laser printers is compatible, the control flow goes to step S37 to select that one printer, and then to step S40 in which the identification number of this printer LP1, LP2 is displayed on the CRT display 41. The present PRINTER SELECTION routine is terminated with this step S41.

In the present example wherein the INTERPRETER A compatible with the pre-selected PRINTER DRIVER C is available on both of the two printers LP1, LP2, an affirmative decision (Yes) is obtained in step S35, and step S36 is implemented to send to these two printers a second inquiry signal asking whether or not the printers are currently engaged in a printing operation, that is, the printers are unoccupied or not. The control flow then goes to step S38 to determine whether either of the two laser printers LP1, LP2 is unoccupied or not. If both of the printers LP1, LP2 are occupied, the control flow goes back to step S36. Steps S36 and S38 are repeatedly implemented until either of the two printers becomes unoccupied. When an affirmative decision (Yes) is obtained in step S38, step S39 is implemented to select the single unoccupied printer LP1 or LP2, or one of the two unoccupied printers LP1, LP2 according to a predetermined priority order, for example, the first printer LP1. Step S39 is followed by step S40 in which the identification number of the selected printer LP1, LP2 is displayed on the CRT display 41.

Steps S39 and 41 may be modified such that the number or numbers of the laser printer or printers LP1, LP2 and the identification number or numbers of the compatible interpreter or interpreters are displayed on the CRT display 41, so that the desired laser printer LP1, LP2 is selected by the operator of the personal computer PC1, rather than the computer PC1 automatically selects one of the printers.

If none of the printers LP1, LP2 has the compatible interpreter, i.e., INTERPRETER A, a negative decision (No) is obtained in step S33, and step S34 is implemented to provide a suitable alarm message on the CRT display 41. The alarm message may be a statement "PRINTING IS NOT POSSIBLE ON THE PRINTERS TO WHICH THIS COMPUTER IS CONNECTED.". In this case, the currently selected printer driver, i.e., PRINTER DRIVER C is replaced by another printer driver available, for example, by the PRINTER DRIVER D compatible with the INTERPRETER B, so that the routine of FIG. 8 is repeated with respect to this newly selected printer driver.

In the illustrated embodiment of FIGS. 7 and 8, the INTERPRETER A and INTERPRETER B which are compatible with the PRINTER DRIVER C and PRINTER DRIVER D, respectively, are available on both of the two printers LP1, LP2. However, other language interpreters may be available on one or both of the printers LP1, LP2. For instance, the INTERPRETERS A and B are available on the first printer LP1, while the INTERPRETER A and an INTER- PRETER E for a printing control language applicable to type setting equipment as well as personal or office printers are available on the second printer LP2. In this case, if the operator of the second personal computer PC2 desires to print using the PRINTER DRIVER C while the first laser printer LP1 is occupied engaged in a printing operation according to print data received from the first personal computer PC1, the printing operation according to print data from the second personal computer PC2 can be immediately effected on the second printer LP2, provided the second printer LP2 is unoccupied.

In the present second embodiment, one of the laser printers LP1, LP2 is automatically selected by each personal computer PC according to the interpreter-identification data sent from the printers LP1, LP2 in response to the inquiry signal which is transmitted to the printers in a broadcasting fashion. Consequently, the operator of each personal computer PC does not have to manipulate the keyboard 41 for selecting one of the laser printers LP1, LP2. Thus, the printing operation is completely automated, and the printing efficiency of the printing system (network of the computers PC and printers LP) is considerably improved.

Steps S31 and S32 may be modified such that the inquiry signal sent in step S31 from each personal computer PC1, PC2, PC2 asks each of the laser printers LP1, LP2 to provide interpreter-identification data representative of all the interpreters available, rather than only the interpreter or interpreters compatible with the pre-selected printer driver, and such that the laser printer or printers LP1, LP2 on which the interpreter compatible with the pre-selected printer driver (PRINTER DRIVER C) is available are selected in step S32 based on the interpreter-identification data received from the printers.

While the present invention has been described in its presently preferred embodiments with a certain degree of particularity, it is to be understood that the invention may be embodied with various changes, modifications and improvements, which may occur to those skilled in the art within the scope of the invention defined in the following claims.

What is claimed is:

1. A printing system including a printing device which has at least one language interpreter for interpreting print data for performing a printing operation, and a data processing device which is connected to said printing device through a bidirectional interface and which has a plurality of printer drivers through which said print data are sent to said printing device, wherein the improvement comprises:

said data processing device including inquiring means for sending to said printing device an inquiry signal to ask said printing device to send back to said data processing device interpreter-identification data representative of said at least one language interpreter, and printer driver selecting means for selecting one of said plurality of printer drivers which is compatible with one of said at least one language interpreter, on the basis of said interpreter-identification data received from said printing device; and said printing device including ID data output means responsive to said inquiry signal, for sending said interpreter-identification data to said data processing device.

2. A printing system according to claim 1, wherein said printing device has a plurality of language interpreters, and said printer driver selecting means comprises means for determining, on the basis of said interpreter-identification data, whether or not a plurality of said plurality of printer drivers are compatible with respective ones of said plurality of language interpreters.

3. A printing system according to claim 2, further comprising means for selecting one of said plurality of said plurality of printer drivers, according to a predetermined priority order of selection.

4. A printing system according to claim 1, wherein said printer driver selecting means comprises means for determining whether or not said interpreter-identification data have been received from said printing device within a predetermined length of time after said inquiry signal is sent from said inquiring means, and providing an alarm if said interpreter-identification data have not been received within said predetermined length of time.

5. A printing system according to claim 1, wherein said printer driver selecting means comprises means for determining, on the basis of said interpreter-identification data, whether none of said plurality of said printer drivers are compatible with said at least one language interpreter, and providing an alarm if none of said plurality of said printer drivers are compatible with said at least one language interpreter.

6. A printing system according to claim 1, wherein said printing device further includes memory means for storing said interpreter-identification data, said ID data output means reading said interpreter-identification data from said memory means and sending said interpreter-identification data to said data processing device, in response to said inquiry signal.

7. A printing system according to claim 1, wherein said data processing device further includes first memory means for storing said printer drivers, and second memory means for storing said one of said plurality of printer drivers which is selected by said printer driver selecting means.

8. A printing system according to claim 1, wherein said data processing device has an automatic printer driver selecting mode, and further includes means for determining whether or not said automatic printer driver selecting mode is selected, said inquiring means and said printer driver selecting means are operated when said automatic printer driver selecting mode is selected.

9. A printing system including a plurality of printing devices each of which has at least one language interpreter for interpreting print data for performing a printing operation, and at least one data processing device each of which is connected to said plurality of printing devices through a bidirectional interface and has at least one printer driver through which said print data are sent to one of said plurality of printing devices, wherein the improvement comprises:

each of said at least one data processing device including inquiring means for sending to said plurality of printing devices an inquiry signal to ask said printing devices to send back to said each data processing device interpreter-identification data representative of said at least one language interpreter of each of said printing devices, and printer selecting means for selecting, on the basis of said interpreter-identification data received from said printing devices, one of said printing devices which has the language interpreter compatible with one of said at least one printer driver of said each data processing device; and each of said printing devices including ID data output means responsive to said inquiry signal received from said at least one data processing device, for sending said interpreter-identification data of said each printing device to one of said at least one data processing device from which said inquiry signal is received.

10. A printing system according to claim 9, wherein said each data processing device has a plurality of printer drivers, and further includes reading means for reading a pre-selected one of said plurality of printer drivers, said printer selecting means selecting one of said printing devices which has the language interpreter compatible with the printer driver which is read by said reading means.

11. A printing system according to claim 10, wherein said inquiring means of said each data processing device sends to said each printing device the inquiry signal to ask said each printing device to send back to said each data processing device the interpreter-identification data which represent at least one of said at least one language interpreter which is compatible with the pre-selected one of said printer drivers.

12. A printing system according to claim 10, wherein said inquiring means of said each data processing device sends to said each printing device the inquiry signal to ask said each printing device to send back to said each data processing device the interpreter-identification data which represent all of said at least one language interpreter which is compatible with the pre-selected one of said printer drivers.

13. A printing system according to claim 10, wherein said printer selecting means comprises means for determining, on the basis of said interpreter-identification data, whether or not a plurality of said plurality of printing devices have the language interpreters which are compatible with one of said at least one printer driver of said each data processing device, said printer selecting means further comprising means for selecting one of said plurality of said plurality of printing devices, according to a predetermined priority order of selection.

14. A printing system according to claim 13, wherein said printer selecting means further comprises means for sending to said plurality of said plurality of printing devices a second inquiry signal to ask said plurality of said plurality of printing devices to send back to said each data processing device a reply signal indicative of whether or not each of said plurality of said plurality of printing devices is currently unoccupied, said printer selecting means selecting one of said plurality of said plurality of printing devices which is currently unoccupied.

15. A printing system according to claim 14, wherein said printer selecting means selects one of said plurality of said plurality of printing devices according to said predetermined priority order of selection, when said reply signals received indicate that said plurality of said plurality of printing devices are unoccupied.

16. A printing system according to claim 9, wherein said printer selecting means comprises means for determining, on the basis of said interpreter-identification data, whether none of said plurality of printers (LP1, LP2) have the language interpreter compatible with any one of said at least one printer driver of said each data processing device, and providing an alarm if none of said plurality of printers have the language interpreter compatible with any one of said at least one printer driver of said each data processing device.

17. A printing system according to claim 9, wherein said each printing device further includes memory means for storing said interpreter-identification data, said ID data output means reading said interpreter-identification data from said memory means and sending said interpreter-identification data to the data processing device from which said inquiry signal is received.

18. A printing system according to claim 9, wherein said each data processing device further includes first memory means for storing said at least one printer driver, and second memory means for storing data indicative of said one of the printing devices which is selected by said printer selecting means.

19. A printing system according to claim 9, wherein said inquiring means asks said each printing device to send back printer-identification data indicative of said each printing device, together with said interpreter-identification data, in response to said inquiry signal.

20. A printing system according to claim 9, wherein said inquiring means sends to said plurality of printing devices said inquiry signal in a broadcasting fashion.

21. A printing system according to claim 9, wherein said inquiring means sends said inquiry signal to ask each of said printing devices to send back to said each data processing device said interpreter-identification data which represent one of said at least one language interpreter of said each printing device which is compatible with a pre-selected one of said at least one printer driver of said each data processing device.

22. A printing system according to claim 9, wherein said inquiring means sends said inquiry signal to ask each of said printing devices to send back to said each data processing device said interpreter-identification data which represent all of said at least one language interpreter of said each printing device, said printer selecting means selecting, on the basis of said interpreter-identification data, one of said printing devices which has the language interpreter compatible with a selected one of said at least one printer driver of said each data processing device.

* * * * *